US008830306B2

(12) United States Patent
Chen et al.

(10) Patent No.: US 8,830,306 B2
(45) Date of Patent: Sep. 9, 2014

(54) IMAGE CONTROLLERS AND DISPLAY DEVICES

(75) Inventors: Cheng-Yi Chen, Tainan County (TW); Pot-Sun Lin, Tainan County (TW); Ying-Jen Chen, Tainan County (TW); Chun-Jui Wang, Tainan County (TW)

(73) Assignee: Innolux Corporation, Miao-Li County (TW)

( * ) Notice: Subject to any disclaimer, the term of this patent is extended or adjusted under 35 U.S.C. 154(b) by 922 days.

(21) Appl. No.: 12/683,249

(22) Filed: Jan. 6, 2010

(65) Prior Publication Data

US 2010/0177175 A1 Jul. 15, 2010

(30) Foreign Application Priority Data

Jan. 13, 2009 (TW) .............................. 98101047 A (51) Int. Cl.
*H04N 15/00* (2006.01)
*G09G 3/00* (2006.01)
*G02B 27/26* (2006.01)
*H04N 13/04* (2006.01)

(52) U.S. Cl.
CPC .............. *G09G 3/003* (2013.01); *G02B 27/26* (2013.01); *H04N 13/0434* (2013.01); *H04N 13/0422* (2013.01)
USPC ........................................................ 348/58

(58) Field of Classification Search
USPC ........................................................ 348/58
See application file for complete search history.

(56) References Cited

U.S. PATENT DOCUMENTS

| 6,169,590 B1 * | 1/2001 | Abileah et al. ................. 349/120 |
| 6,195,205 B1 | 2/2001 | Faris |
| 6,757,045 B1 * | 6/2004 | Asao et al. ..................... 349/172 |
| 7,113,231 B2 * | 9/2006 | Conner et al. ..................... 349/5 |
| 2006/0192746 A1 * | 8/2006 | Ioki et al. ....................... 345/102 |
| 2008/0304151 A1 | 12/2008 | Ura |

FOREIGN PATENT DOCUMENTS

CN 101320133 12/2008

OTHER PUBLICATIONS

Taiwanese language office action dated Mar. 4, 2013.
Chinese language office action dated Jun. 30, 2014.
English language translation of abstract of CN 101320133 (published Dec. 10, 2008).

* cited by examiner

*Primary Examiner* — Sath V Perungavoor
*Assistant Examiner* — Jeffery Williams
(74) *Attorney, Agent, or Firm* — McClure, Qualey & Rodack, LLP (57) ABSTRACT

A representative display device includes a display module, a polarization controller and a compensator. Each pixel region of the display module has a first sub-pixel region, a second sub-pixel region and a third sub-pixel region respectively providing a first light, a second light and a third light of the same polarization. The polarization controller has control regions that control the polarization of the light passing therethrough. The compensator has first compensating regions, second compensating regions and third compensating regions corresponding to the first sub-pixel regions, the second sub-pixel regions and the third sub-pixel regions, respectively. The compensations of phase retardation of the first light, the second light and the third light generated by passing through the first compensating regions, the second compensating regions and the third compensating regions are different from one another.

10 Claims, 5 Drawing Sheets

IMAGE CONTROLLERS AND DISPLAY DEVICES

BACKGROUND

1. Technical Field

The present invention generally relates to displaying of images.

2. Description of Related Art

Some display apparatuses are developed not only to be light, thin, compact and small, but also to display stereoscopic images. Generally, the principle of displaying three-dimensional (or "stereoscopic") images is to display two different images to the left eye and the right eye of the viewer, respectively. As such, a stereoscopic image can be perceived by the human brain of the viewer through mixing these two images. Conventionally, there are two methods for displaying different images to the left eye and the right eye; one is the grating technique, the other is the polarization technique.

With respect to the grating technique, the light beams of different images will pass through different gratings and respectively enter the left eye and the eye of the viewer. Alternatively, the polarization technique utilizes the polarity of light. For instance, the light of one image only exhibits linear polarizing of a vertical direction and the light of the other image exhibits only linear polarizing of a horizontal direction. Meanwhile, the left eye and the right eye of the viewer can receive the corresponding images with the use of polarized lenses exhibiting appropriate polarizing directions so that the viewer can perceive a stereoscopic image.

Figure 1:
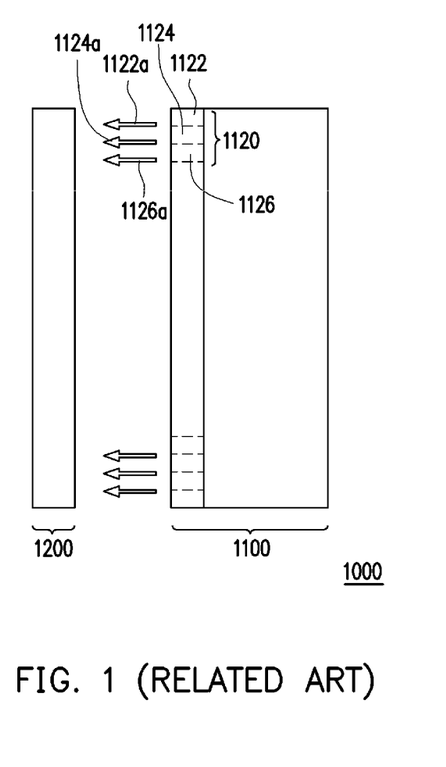
FIG. 1 is a local cross-sectional view showing a conventional display apparatus.

FIG. 1 is a cross-sectional view showing a conventional display apparatus. As shown in FIG. 1, a display apparatus 1000 comprises a display module 1100 and a polarization controller 1200. The display module 1100 has a plurality of pixel regions 1120 arranged in an array. Each of the pixel regions 1120 has a first sub-pixel region 1122, a second sub-pixel region 1124 and a third sub-pixel region 1126. When the display module 1100 is driven, the first sub-pixel region 1122, the second sub-pixel region 1124 and the third sub-pixel region 1126 provide red light 1122a, green light 1124a and blue light 1126a, respectively. The red light 112a, the green light 1124a and the blue light 1126a also exhibit linear polarization.

When red light 1122a, green light 1124a and blue light 1126a pass through the polarization controller 1200, the polarizing directions of the red light 1122a, the green light 1124a and the blue light 1126a will deflect. After the polarizing directions of the red light 1122a, the green light 1124a and the blue light 1126a deflect, the horizontal components of the red light 1122a, the green light 1124a and the blue light 1126a enter the left eye of the viewer through the polarized glass having the horizontal polarizing direction and the vertical components of the red light 1122a, the green light 1124a and the blue light 1126a enter the right eye of the viewer through the polarized glass having the vertical polarizing direction. Based on the horizontal components of the red light 1122a, the green light 1124a and the blue light 1126a with the left-eye image information of the stereoscopic image and the vertical components of the red light 1122a, the green light 1124a and the blue light 1126a with the right-eye image information of the stereoscopic image, a stereoscopic image can be perceived by the viewer.

However, light beams with different wavelengths generate different phase retardations after passing through the polarization controller 1200. The conventional polarization controller 1200 is made of a single material of uniform thickness. If the design of the polarization controller 1200 is to lead the blue light 1126a generating $\pi/2$ phase retardation, the phase retardation of the green light 1124a is smaller than $\pi/2$, and the phase retardation of the red light 1122a is smaller than that of green light 1124a. Hence, the components of the green light 1124a and the red light 1122a entering the left eye and the right eye through the polarized glasses, respectively, differ from ideal. That is, the stereoscopic image perceived by the viewer is incorrect.

In order to solve the problem mentioned above, another conventional technique is performed to estimate the difference in phase retardation of light beams with different wavelengths after the light beams pass through the polarization controller 1200 and to compensate for the difference in phase retardation in advance when driving the display module 1100. However, the aforementioned technique requires relatively complex and expensive circuitry to implement the data calculation.

SUMMARY

An exemplary embodiment of an image controller comprises a polarization controller and a compensator. The polarization controller has a plurality of control regions for controlling polarization of a first light with a first wavelength, a second light with a second wavelength and a third light with a third wavelength. First light, second light and third light pass through the polarization regions respectively. The compensator has a plurality of first compensating regions, a plurality of second compensating regions and a plurality of third compensating regions. The first compensating regions, the second compensating regions and the third compensating regions respectively receive the first light, the second light and the third light. Compensations of phase retardation of the first light generated by passing through the first compensating regions, the second light generated by passing through the second compensating regions and third light generated by passing through the third compensating regions are different from one another, and after passing through the polarization controller and the compensator, the polarization of the first light, second light and third light are the same.

An exemplary embodiment of a display apparatus comprises a display module, a polarization controller and a polarization compensator. The display module has a plurality of pixel regions arranged in an array. Each of the pixel regions has a first sub-pixel region, a second sub-pixel region and a third sub-pixel region. The first sub-pixel regions, the second sub-pixel regions and the third sub-pixel regions respectively provide a first light, a second light and a third light. The polarizations of first light, second light and third light are the same. The polarization controller is disposed on a display surface of the display module and has a plurality of control regions. Each of the control regions corresponds to one of the first sub-pixel regions, the second sub-pixel regions or the third sub-pixel regions. The control regions control the polarization of light beams passing though the control regions. The compensator has a plurality of first compensating regions corresponding to the first sub-pixel regions, a plurality of second compensating regions corresponding to the second sub-pixel regions and a plurality of third compensating regions corresponding to the third sub-pixel regions. The compensations of the phase retardation of the first light, the second light and the third light respectively generated by the first compensating regions, the second compensating regions and the third compensating regions are different from one another.

Several exemplary embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate non-limiting embodiments of the invention.

DESCRIPTION OF EMBODIMENTS

Figure 2:
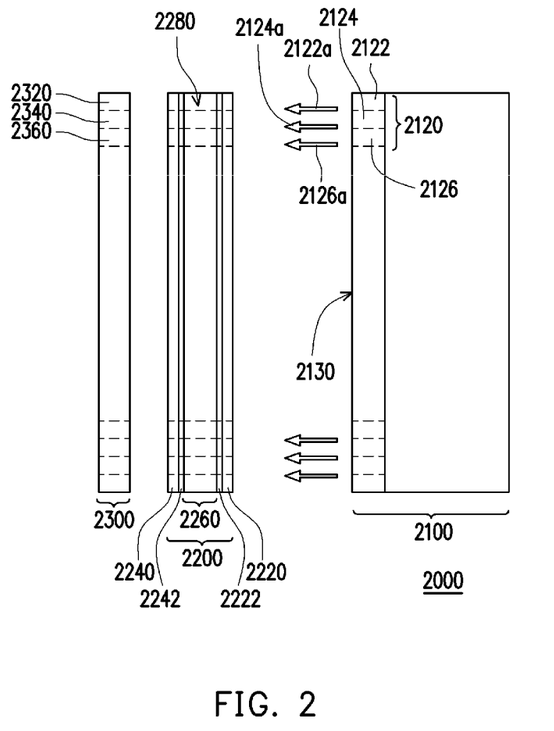
FIG. 2 is a partial cross-sectional view of an exemplary embodiment of a display apparatus.

FIG. 2 is a partial cross-sectional view of an exemplary embodiment of a display apparatus. As shown in FIG. 2, a display apparatus 2000 incorporates a display module 2100, a polarization controller 2200 and a polarization compensator 2300. The display module 2100 has a plurality of pixel regions 2120 arranged in an array. Each of the pixel regions 2120 has a first sub-pixel region 2122, a second sub-pixel region 2124 and a third sub-pixel region 2126. In the present embodiment, the first sub-pixel regions 2122, the second sub-pixel regions 2124 and the third sub-pixel regions 2126 are respectively arranged in a plurality of columns.

The first sub-pixel regions 2122, the second sub-pixel regions 2124 and the third sub-pixel regions 2126 respectively provide a first light 2122a with a first wavelength, a second light 2124a with a second wavelength, and a third light 2126a with a third wavelength. The polarizations of the first light 2122a, the second light 2124a and the third light 2126a are the same. In the present embodiment, the wavelength of the first light 2122a is longer than the wavelength of the second light 2124a, and the wavelength of the second light 2124a is longer than the wavelength of the third light 2126a. For instance, the first light 2122a, the second light 2124a and the third light 2126a can be red light, green light and blue light respectively. In some embodiments, the wavelength of the first light 2122a is about 650 nm, the wavelength of the second light 2124a is about 550 nm, and the wavelength of the third light 2216a is about 450 nm. However, the wavelengths of the first light 2212a, the second light 2214a and third light 2216a can be other values.

The polarization controller 2200 is disposed on a display surface 2130 of the display module 2100. The polarization controller 2200 of the present embodiment includes a first substrate 2220, a second substrate 2240 and a liquid crystal layer 2260. The first substrate 2220 and the second substrate 2240 have a first electrode layer 2222 and a second electrode layer 2242 respectively. The liquid crystal layer 2260 is sandwiched by the first electrode layer 2222 and the second electrode layer 2242. When voltages are applied to the first electrode layer 2222 and the second electrode layer 2242, the liquid crystal molecules in the liquid crystal layer 2260 rotate so that the polarization of the light beams passing through the liquid crystal layer 2260 changes. The polarization controller 2200 has a plurality of control regions 2280. Each of the control regions 2280 corresponds to one of the first sub-pixel regions 2212, one of the second sub-pixel regions 2214 or one of the third sub-pixel regions 2216. These control regions 2280 are used to control the polarizations of the light beams passing through the control regions 2280. The polarization controller 2200 changes the polarizations of light beams while passing through the polarization controller. Based on one component of the light beams having the left-eye image information in the stereoscopic image and the other component of the light beam having the right-eye image information in the stereoscopic image, a stereoscopic image can be perceived by the viewer.

For instance, when the display module 2100 is driven, the first sub-pixel regions 2122, the second sub-pixel regions 2124 and the third sub-pixel regions 2126 provide the first light 2122a with a first wavelength, the second light 2124a with a second wavelength and the third light 2126a with a third wavelength, respectively. All of the first light 2122a, the second light 2124a and the third light 2126a have vertical linear polarizing directions. Then, when the first light 2122a, the second light 2124a, the third light 2126a pass through the polarization controller 2200, the polarizations of the first light 2122a, the second light 2124a, the third light 2126a change. Hence, each of the first light 2122a, the second light 2124a, and the third light 2126a exhibit a linear polarization component in the horizontal direction and a linear polarization component in the vertical direction. Meanwhile, since the polarization controller 2200 is made of a single material and of a uniform thickness, the phase retardations of the first light 2122a, the second light 2124a and the third light 2126a are different from one another.

However, the compensator 2300 has a plurality of first compensating regions 2320 corresponding to the first sub-pixel regions 2122, a plurality of second compensating regions 2340 corresponding to the second sub-pixel regions 2124, and a plurality of third compensating regions 2360 corresponding to the third sub-pixel regions 2126. The compensations of phase retardation respectively generated by the first compensating regions 2320, the second compensating regions 2340 and the third compensating regions 2360 are different from one another. That is, the polarizations of each of the first light 2122a, the second light 2124a and the third light 2126a are properly modulated.

For instance, when the phase retardation of the polarization controller 2200 is designed according to the first light 2122a, the compensation of phase retardation of the first compensating regions 2320 is zero (i.e. no compensation). Furthermore, in order to properly modulate the polarization of the second light 2124a and the third light 2126a, the second compensating regions 2340 and the third compensating regions 2360 are designed according to the second wavelength of the second light 2124a and the third wavelength of third light 2126a, respectively. Moreover, the phase retardation of the polarization controller 2200 can also be designed according to the second color light 2124a or the third color light 2126a so that the compensation generated by the compensator 2300 can be designed according to the other two lights. It should be noted that the compensation of phase retardation could be positive or negative.

Since the polarization controller 2200 changes the polarizations of the light beams while passing through the polarization controller, and the wavelength of the first color light 2122a is longer than the wavelength of the second color light 2124a and the wavelength of the second color light 2124a is longer than the wavelength of the third color light 2126a, the compensation of phase retardation of the first compensating regions 2320 is smaller than the compensation of phase retardation of the second compensating regions 2340 and the compensation of phase retardation of the second compensating regions 2340 is smaller than the compensation of phase retardation of the third compensating regions 2360.

Also, the polarization compensator 2300 can have at least one alignment mark (not shown). The alignment mark can be used to accurately align the first compensating regions 2320, the second compensating regions 2340 and the third compensating regions 2360 of the polarization compensator 2300 to the first sub-pixel regions 2122, the second sub-pixel regions 2124 and the third sub-pixel regions 2126 of the display module 2100, respectively.

In one embodiment, the wavelength of the first light 2122a that illuminates from the first sub-pixel regions 2122 is about 650 nm, the wavelength of the second light 2124a that illuminates from the second sub-pixel regions 2124 is about 550 nm, and the wavelength of the third light 2126a that illuminates from the third sub-pixel regions 2126 is about 450 nm, therefore the compensation of phase retardation generated by the corresponding first compensating regions 2320 of the compensator 2300 is $R_0=0$ and $R_{th}=0$, the compensation of phase retardation generated by the second compensating regions 2340 is $R_0=50.96$ nm and $R_{th}=141.6$ nm, and the compensation of phase retardation generated by the third compensating regions 2360 is $R_0=49.995$ nm and $R_{th}=139.3$ nm.

Notably, the display module 2000 can be, for example, an organic electro-luminance device panel, a plasma display panel or other display panels. However, since the polarization of lights provided by the general organic electro-luminance device panel and a plasma display panel is not linear polarization, a linear polarizer can be used to achieve the purpose of displaying a stereoscopic image. Moreover, the display apparatus 2000 further comprises a moiré-eliminating film (not shown) configured between the polarization controller 2200 and the display module 2100. In other embodiments, the positions of polarization controller 2200 and compensator 2300 can be exchanged so that, for example, the first color light 2122a, the second color light 2124a and the third color light 2126a can pass through compensator 2300 first and then through polarization controller 2200.

Figure 3:
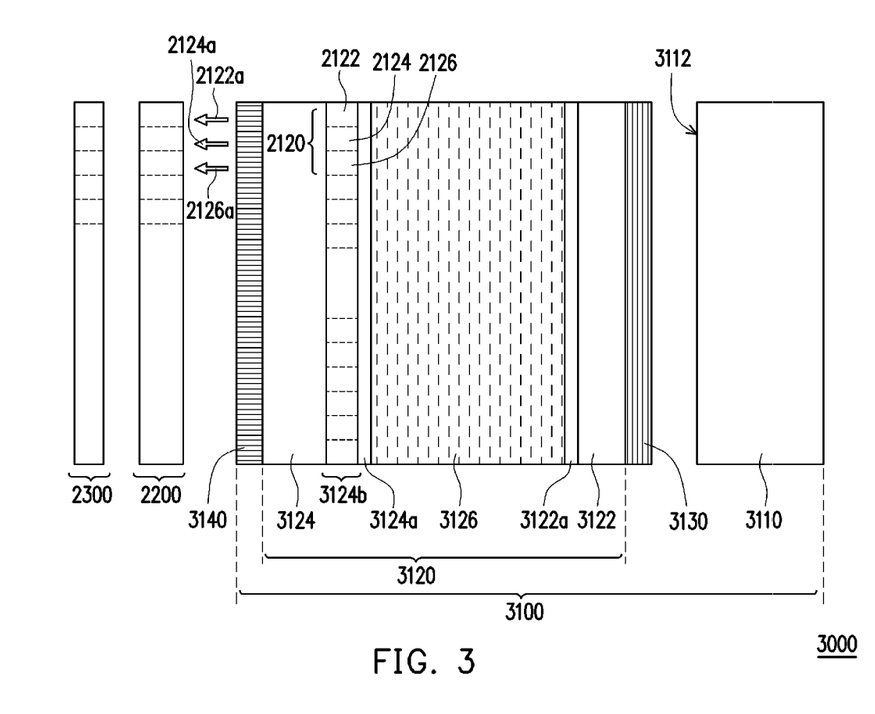
FIG. 3 is a partial cross-sectional view of an exemplary embodiment of a display apparatus.

FIG. 3 is a partial cross-sectional view of another exemplary embodiment of a display apparatus. As shown in FIG. 3, display apparatus 3000 is similar to the display apparatus 2000 and the similar components are labeled with the same reference numbers. The difference between the display apparatus 3000 and the display apparatus 2000 is that the display module of the display apparatus 3000 includes a backlight module 3110, a liquid crystal display panel 3120, a first linear polarizer 3130 and a second linear polarizer 3140. The backlight module 3110 includes a light-emitting surface 3112. The liquid crystal display panel 3120 is disposed on the light-emitting surface 3112 of the backlight module 3110. The liquid crystal display panel 3120 includes a first substrate 3122, a second substrate 3124, and a liquid crystal layer 3126. The first substrate 3122 has a first electrode layer 3122a. The second substrate 3124 has a second electrode layer 3124a and a color filter 3124b. The liquid crystal layer 3126 is sandwiched by the first electrode layer 2222 and the second electrode layer 2242. The first linear polarizer 3130 is disposed between the backlight module 3110 and the liquid crystal display panel 3120. The second linear polarizer 3140 is disposed on the side of the liquid crystal display panel 3120 opposite the backlight module 3110.

The display module 3100 has a plurality of pixel regions 2120 arranged in an array. Each of the pixel regions 2120 has a first sub-pixel region 2122, a second sub-pixel region 2124 and a third sub-pixel region 2126.

As mentioned above, the first sub-pixel regions 2122, the second sub-pixel regions 2124 and the third sub-pixel regions 2126, respectively, provide the first light 2122a, the second light 2124a and the third light 2126a. The functions of the polarization compensator 2300 are described in the aforementioned embodiment.

Figure 4A:
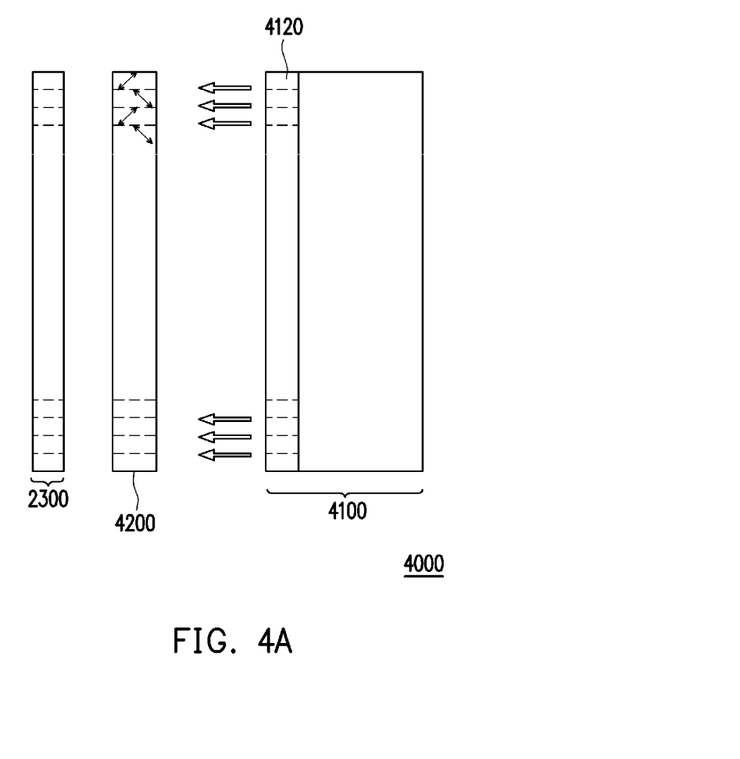
FIG. 4A is a schematic cross-sectional view of an exemplary embodiment of a display apparatus.
Figure 4B:
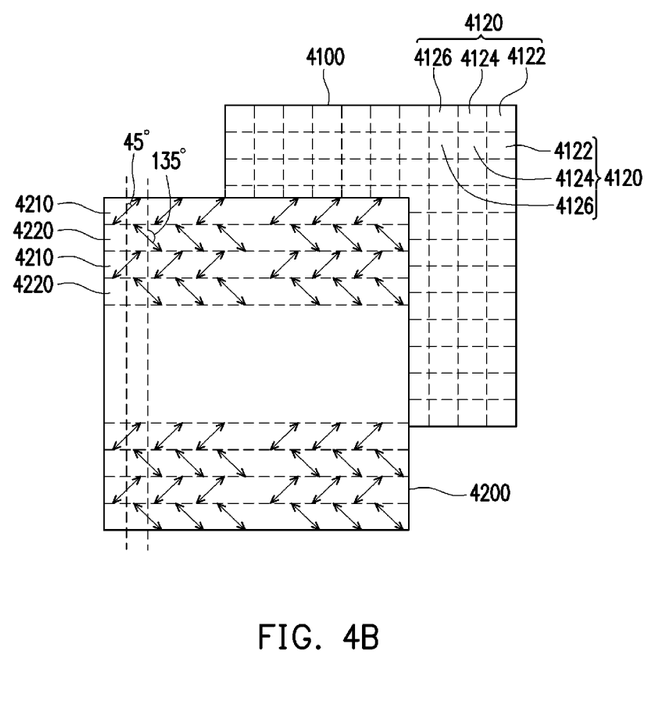
FIG. 4B is a front view of a polarization controller and a display module of the embodiment of FIG. 4A.

FIG. 4A is a schematic cross-sectional view of another embodiment of a display apparatus. FIG. 4B is a front view of a polarization controller and a display module of the embodiment of FIG. 4A. As shown in FIG. 4A and FIG. 4B, a display apparatus 4000 is similar to the display apparatus 2000 and display apparatus 3000, and the similar components are labeled with the same reference numbers. The difference between the display apparatus 4000 and the display apparatus 2000 and display apparatus 3000 is that the polarization controller 4200 is an optical film having first control regions 4210 and second control regions 4220, with regions 4210 and regions 4220 alternating in a row-wise manner such that regions 4210 are interleaved with regions 4220. After passing through the first control regions 4210, the polarization of light is linear and the direction is at an angle of 45 degrees as shown in FIG. 4B. Further, after passing through the control regions 4220, the direction of linear polarization of light is at an angle of 135 degrees as shown in FIG. 4B. The linear polarizing light after passing through the control regions 4210 can be, for example, the light having the left-eye image information and the linear polarizing light after passing through the control regions 4220 can be, for example, the light having the right-eye image information. Meanwhile, the viewer with the glasses having a linear polarizer with 45 degree for the left eye and a linear polarizer with 135 degree for the right eye can view the stereoscopic image.

However, the lights with different wavelengths provided by different pixel regions 4120 of the display module 4100 pass through the control regions 4210 or 4220. As such, the polarizations of some of the lights are at an angle of 45 degrees or 135 degrees, with the polarizations of the other of the lights not being at an angle of 45 degrees or 135 degrees. Thus, in order to display a better stereoscopic image, a compensator 2300 can be disposed behind the polarization controller 4200 to provide different compensations according to different wavelengths of the lights. Hence, the polarizations of all of the lights can be at an angle of 45 degrees or 135 degrees. In the present embodiment, the display module 4100 can be configured similar to the aforementioned display modules 2100 or 3100, for example. It should be noted that each of the control regions 4210 corresponds to a plurality of first sub-pixel regions 4122, a plurality of second sub-pixel regions 4124 and a plurality of third sub-pixel regions 4126. Each of the control regions 4220 corresponds to the first sub-pixel regions 4122, the second sub-pixel regions 4124 and the third sub-pixel regions 4126 as shown in FIG. 4B. The first sub-pixel regions 4122, the second sub-pixel regions 4124 and the third sub-pixel regions 4126 respectively provide a first light 1122a with a first wavelength, a second light 1124a with a second wavelength and a third light 1126a with a third wavelength as mentioned above.

As set forth above, in some embodiments, the compensator can provide different compensations of phase retardation for lights with different wavelengths so that the different phase retardation due to lights with different wavelengths passing through the polarization controller can be eliminated. Hence, a relatively better stereoscopic image may be provided.

Although the present invention has been disclosed by the above embodiments, they are not intended to limit the present invention. Any person having ordinary knowledge in the art may make some modifications and alterations without departing from the spirit and scope of the present invention. Therefore, the scope for which protection is sought by the present invention falls in the appended claims.

What is claimed is:

1. A display apparatus, comprising:
a display module having a plurality of pixel regions arranged in an array, a liquid crystal display panel and a backlight module, wherein the liquid crystal display panel is disposed on a surface of the backlight module and includes a first substrate, a second substrate and a liquid crystal layer sandwiched by the first substrate and the second substrate, wherein each of the pixel regions has a first sub-pixel region, a second sub-pixel region and a third sub-pixel region, and light emitted from the backlight module passes through the first sub-pixel regions, the second sub-pixel regions and the third sub-pixel regions, respectively, so as to provide a first light with a first wavelength, a second light with a second wavelength and a third light with a third wavelength;
a polarization controller configured on a display surface of the display module and having a plurality of control regions, wherein each of the control regions corresponds to one of the first sub-pixel regions, the second sub-pixel regions and the third sub-pixel regions, the control regions control polarizations of the first light, the second light and the third light passing though the control regions, and each of the first light, the second light and the third light exhibits two polarization components along two orthogonal directions after passing through the control regions; and
a compensator configured on a side of the polarization controller away form the display surface and having a plurality of first compensating regions corresponding to the first sub-pixel regions, a plurality of second compensating regions corresponding to the second sub-pixel regions and a plurality of third compensating regions corresponding to the third sub-pixel regions, wherein the polarization components of the first light, the second light and the third light pass through the compensator, compensations of phase retardation respectively generated by the first compensating regions, the second compensating regions and the third compensating regions are different from one another so that different phase retardation due to lights with different wavelengths passing through the polarization controller can be eliminated.

2. The display apparatus of claim 1, wherein:
the first wavelength is longer than the second wavelength, and the second wavelength is longer then the third wavelength;
the compensation of phase retardation generated by the first compensating regions is smaller than the compensation of phase retardation generated by the second compensating regions; and
the compensation of phase retardation generated by the second compensating regions is smaller than the compensation of phase retardation generated by the third compensating regions.

3. The display apparatus of claim 1, wherein the first light, the second light and the third light are red light, green light and blue light, respectively.

4. The display apparatus of claim 1, wherein the first sub-pixel regions, the second sub-pixel regions and the third sub-pixel regions are respectively arranged in a plurality of columns.

5. The display apparatus of claim 1, wherein the polarization controller comprises:
a first substrate having a first electrode layer;
a second substrate having a second electrode layer; and
a liquid crystal layer sandwiched by the first electrode layer and the second electrode layer.

6. A display apparatus, comprising:
a display module having a plurality of pixel regions arranged in an array a liquid crystal display panel and a backlight module, wherein the liquid crystal display panel is disposed on a surface of the backlight module and includes a first substrate, a second substrate and a liquid crystal layer sandwiched by the first substrate and the second substrate, wherein each of the pixel regions has a first sub-pixel region, a second sub-pixel region and a third sub-pixel region, and light emitted from the backlight module passes through the first sub-pixel regions, the second sub-pixel regions and the third sub-pixel regions respectively so as to provide a first light, a second light and a third light, and polarization of the first light, the second light and the third light are the same;
a polarization controller configured on a display surface of the display module and having a plurality of first control regions and a plurality of second control regions, wherein the first control regions and the second control regions are configured in an alternating row-wise arrangement, and each of the first control regions corresponds to the first sub-pixel regions, the second sub-pixel regions and the third sub-pixel regions, and each of the second control regions corresponds to the first sub-pixel regions, the second sub-pixel regions and the third sub-pixel regions, and the first control regions and the second control regions control polarization of the lights passing though the first control regions and the second control regions, and at least one of the first light, the second light and the third light has a first linear polarization direction after passing through the first control regions and said at least one light has a second linear polarization direction after passing through the second control regions, and the first linear polarization direction is perpendicular to the second linear polarization direction; and
a compensator configured on a side of the polarization controller away form the display surface and having a plurality of first compensating regions corresponding to the first sub-pixel regions, a plurality of second compensating regions corresponding to the second sub-pixel regions and a plurality of third compensating regions corresponding to the third sub-pixel regions, wherein the first linear polarization direction and the second linear polarization direction of the at least one light pass through the compensator, compensations of phase retardation respectively generated by the first compensating regions, the second compensating regions and the third compensating regions are different from one another so that different phase retardation due to lights with different wavelengths passing through the polarization controller can be eliminated, and after passing through the polarization controller and the compensator, the polarization of the first light, the second light and the third light are the same.

7. The display apparatus of claim 6, wherein:
the first wavelength is longer than the second wavelength, and the second wavelength is longer then the third wavelength;
the compensation phase retardation generated by the first compensating regions is smaller than the compensation of phase retardation generated by the second compensating regions; and the compensation of phase retardation generated by the second compensating regions is smaller than the compensation of phase retardation generated by the third compensating regions.

8. The display apparatus of claim 6, wherein the first light, the second light and the third light are red light, green light and blue light, respectively.

9. The display apparatus of claim 6, wherein the first sub-pixel regions, the second sub-pixel regions and the third sub-pixel regions are respectively arranged in a plurality of columns.

10. The display apparatus of claim 6, wherein the polarization controller comprises:
- a first substrate having a first electrode layer;
- a second substrate having a second electrode layer; and
- a liquid crystal layer sandwiched by the first electrode layer and the second electrode layer.

* * * * *